US010288026B2

(12) United States Patent
Martinez et al.

(10) Patent No.: US 10,288,026 B2
(45) Date of Patent: May 14, 2019

(54) COMPRESSION ENGINE WITH DIRECT FUEL INJECTION WITH COMPRESSION IGNITION COMPRISING MEANS FOR COOLING THE PISTON

(71) Applicant: IFP Energies nouvelles, Rueil-Malmaison (FR)

(72) Inventors: Lionel Martinez, Maulette (FR); Stéphane Richard, Bazainville (FR); Olivier Laget, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/126,141

(22) PCT Filed: Feb. 5, 2015

(86) PCT No.: PCT/EP2015/052440
§ 371 (c)(1),
(2) Date: Sep. 14, 2016

(87) PCT Pub. No.: WO2015/135699
PCT Pub. Date: Sep. 17, 2015

(65) Prior Publication Data
US 2017/0096978 A1    Apr. 6, 2017

(30) Foreign Application Priority Data
Mar. 14, 2014 (FR) ...................... 14 52118

(51) Int. Cl.
*F02M 61/18* (2006.01)
*F02B 23/06* (2006.01)
*F02F 3/22* (2006.01)

(52) U.S. Cl.
CPC ....... *F02M 61/182* (2013.01); *F02B 23/0672* (2013.01); *F02B 23/0693* (2013.01); *F02F 3/22* (2013.01); *Y02T 10/125* (2013.01)

(58) Field of Classification Search
CPC .......... F02B 1/12; F02B 9/02; F02B 23/0651; F02B 23/0669; F02B 23/0672;
(Continued)

(56) References Cited

U.S. PATENT DOCUMENTS 2,040,972 A * 5/1936 Becker ...................... F02F 3/22
123/41.35
5,595,145 A    1/1997 Ozawa
(Continued)

FOREIGN PATENT DOCUMENTS

DE  10 2010 044514 A1    4/2011
FR       2839116 A1    10/2003
(Continued)

OTHER PUBLICATIONS

International Search Report for PCT/EP2015/052440 dated Mar. 25, 2015; English translation submitted herewith (7 Pages).

*Primary Examiner* — Hung Q Nguyen
*Assistant Examiner* — Johnny H Hoang
(74) *Attorney, Agent, or Firm* — Fitch, Even, Tabin & Flannery LLP

(57) ABSTRACT

The present invention relates to a compression-ignition direct-injection internal-combustion engine comprising at least a cylinder (10), a cylinder head (12) carrying fuel injection (14) projecting the fuel in at least two fuel jet sheets (36, 38) with different sheet angles (A1, A2), a piston (16) sliding in the cylinder, a combustion chamber (34) limited on one side by upper face (44) of the piston comprising a projection (48) extending in the direction of the cylinder head and arranged in the center of a concave bowl
(Continued)

(46) with at least two mixing zones (Z1, Z2), and piston cooler (76) housed in the material of the piston. According to the invention, the piston cooler comprises at least one circumferential gallery (78, 82) concentric to piston bowl (46) and arranged opposite at least one mixing zone (Z1, Z2).

17 Claims, 2 Drawing Sheets

(58) Field of Classification Search
CPC .............. F02B 23/0687; F02B 23/0693; F02B 23/0696; F02M 61/14; F02M 61/1806; F02M 61/1813; F02M 61/182; F02M 45/086; F02F 1/242; F02F 3/26
USPC ....... 123/275, 276, 290, 294, 298, 301, 305, 123/307
See application file for complete search history.

(56) References Cited

U.S. PATENT DOCUMENTS

| | | | | |
|---|---|---|---|---|
| 6,513,487 | B1* | 2/2003 | Jorach | F02B 1/12 123/269 |
| 7,185,614 | B2* | 3/2007 | Meffert | F02B 23/0672 123/269 |
| 7,406,941 | B2* | 8/2008 | Zhu | F02F 3/0084 123/193.6 |
| 8,327,822 | B2* | 12/2012 | Asai | F02B 23/0651 123/298 |
| 8,677,970 | B2* | 3/2014 | Venugopal | F02B 23/0651 123/193.1 |
| 8,807,109 | B2* | 8/2014 | Muscas | F02F 3/003 123/193.6 |
| 9,121,336 | B2* | 9/2015 | Lee | F02B 23/0651 |
| 9,284,877 | B2* | 3/2016 | Yoo | F02B 23/0696 |
| 9,429,065 | B2* | 8/2016 | Zoeller | F02B 23/0651 |
| 9,951,715 | B2* | 4/2018 | Scharp | F01P 3/08 |
| 9,970,384 | B2* | 5/2018 | Muscas | F02F 3/003 |
| 2003/0221639 | A1 | 12/2003 | Weng et al. | |
| 2004/0020457 | A1* | 2/2004 | Regueiro | F02B 23/0669 123/276 |
| 2005/0120995 | A1* | 6/2005 | Tsujimoto | F02B 23/0669 123/299 |
| 2012/0073526 | A1* | 3/2012 | Dion | F01B 7/08 123/41.44 |
| 2015/0020765 | A1* | 1/2015 | Pierpont | F02F 3/28 123/27 R |
| 2016/0265418 | A1* | 9/2016 | Martinez Alvarado ... | F02B 1/12 |
| 2016/0341106 | A1* | 11/2016 | Richard | F02M 45/086 |
| 2016/0348571 | A1* | 12/2016 | Huang | F02B 43/00 |

FOREIGN PATENT DOCUMENTS

| | | |
|---|---|---|
| FR | 2868480 A1 | 10/2005 |
| FR | 3012522 A1 | 5/2015 |
| JP | S61144242 U | 9/1986 |

* cited by examiner

COMPRESSION ENGINE WITH DIRECT FUEL INJECTION WITH COMPRESSION IGNITION COMPRISING MEANS FOR COOLING THE PISTON

BACKGROUND OF THE INVENTION

Field of the Invention

The present invention relates to a compression-ignition direct-injection combustion engine comprising piston cooling. More particularly the invention relates to an engine usable in the air transport, road transport, or in stationary equipments such as engines for generators.

Description of the Prior Art

This type of engine generally comprises at least a cylinder, a piston provided with a projection located in a concave bowl which slides in the cylinder in a reciprocating rectilinear motion, an intake for an oxidizer, a burnt gas exhaust, a combustion chamber and an injector for injecting a fuel into the combustion chamber.

As it is generally understood, upon design of an engine, the performance, pollutant emission and mechanical strength constraints of the combustion chamber are increasingly high and the devices for meeting them are the opposite being low. Thus, performance increase generally leads to an increase in emissions and to higher mechanical stresses.

It is therefore necessary to overcome these stresses to guarantee a limitation of pollutant emissions and a satisfactory mechanical strength over the entire operating range of the engine, and in particular at very high load. In particular for pollutant emissions, using all of the oxidizer present in the combustion chamber, for example an oxidizer comprising air at ambient pressure, supercharged air or a mixture of air (supercharged or not) and recirculated burnt gas, is of great importance.

Indeed, the fuel mixture (oxidizer/fuel) in the combustion chamber needs to be as homogeneous as possible.

In practice, the fuel remains confined in the bowl and cannot mix with the oxidizer contained notably in the compression area or the compression zone that is in the volume located in the upper part of the combustion chamber limited by the cylinder wall and the face of the cylinder head opposite the piston.

This involves the drawback of creating areas of high richness in the combustion zone, which generate a high production of soots, carbon oxide (CO) and unburnt hydrocarbons (HC) upon combustion of the fuel mixture.

Furthermore, regarding the problem of mechanical strength, the thermal load is focused on the re-entrant part of the piston, that is in the neck of the bowl or in the restriction of diameter that marks the transition between the bowl of the piston and the upper zone encompassing the compression zone, which may be limiting in terms of mechanical strength at very high loads.

To overcome these drawbacks, and as better described in French patent application No. 13/60,426 filed by the applicant, an internal-combustion engine comprising fuel injection with injectors providing fuel jets having at least two sheet angles and a piston comprising a bowl provided with a projection with two combustion zone volumes and internal aerodynamics substantially improves the combustion quality.

However, the desire to increase the power density of this type of engine leads the designers to reconsider the size and therefore the mass of the various constituent parts of this type of engine.

It is noteworthy that the engine block is one of the most important parts of the engine and reducing the height of this part (deck height reduction) in order to significantly reduce the mass thereof is often considered. This height change notably leads to a piston height reduction.

Now, increasing the power density of the engine also involves increasing the specific power of the engine.

This causes a substantial increase in the mechanical stresses undergone by the constituent parts of the combustion chamber, such as the cylinder head, the cylinder and the piston. The desire to maintain a high reliability level, notably regarding the mechanical strength for this type of engine, despite the necessary piston height reduction and the stress increase, requires using steel as the constituent material of this piston instead of the aluminium which is conventionally used, in order to enable better piston resistance.

However, steel has lower thermal conductivity than aluminium. It is thus necessary to use a mechanism for removal of the heat from the zones of this part of the engine which are most subjected to thermal stress, such as the re-entrant, the bowl bottom and the compression zone.

As is widely known, notably through French patent application No. 2,839,116, it is possible to improve cooling of this type of piston using cooling provided by an oil circulation gallery coupled with a specific oil spray system on the lower face of the piston.

However, such a gallery layout is not optimized to date, which causes unwanted piston temperature rises.

The present invention thus is directed to overcoming the aforementioned drawbacks by a piston that comprises galleries providing simple and inexpensive cooling thereof.

SUMMARY OF THE INVENTION

The invention therefore relates to a compression-ignition direct-injection internal-combustion engine comprising at least a cylinder, a cylinder head carrying fuel injectors which project the fuel in at least two fuel jet sheets with different sheet angles, a piston sliding in the cylinder, a combustion chamber limited on one side by the upper face of the piston comprising a projection extending in the direction of the cylinder head and arranged in the center of a concave bowl with at least two mixing zones, and a piston cooler housed in the material of the piston, characterized in that the cooler comprises at least one circumferential gallery concentric to the piston bowl and arranged opposite at least one mixing zone.

The shape of the section of the gallery can be cylindrical.

The cross-sectional area of the gallery can range between 20 mm$^2$ and 200 mm$^2$.

The surface area of one gallery can be different from the surface area of the other gallery.

The gallery can extend opposite the two mixing zones.

The distances between the bowl surfaces and the walls of the closest gallery can range between 2 mm and 7 mm.

BRIEF DESCRIPTION OF THE DRAWINGS

Other features and advantages of the invention will be clear from reading the description hereafter, given by way of non-limitative example, with reference to the accompanying figures wherein.

DETAILED DESCRIPTION OF THE INVENTION

Figure 1:
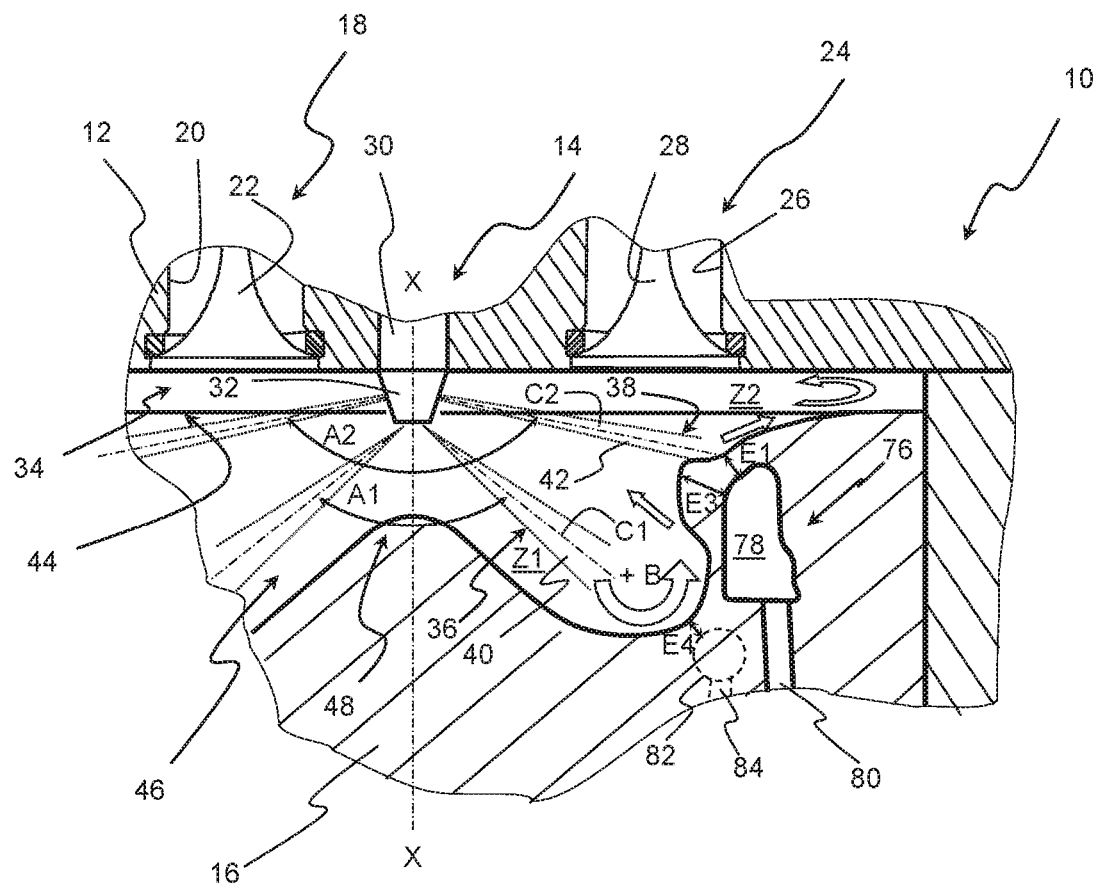
FIG. 1 shows an internal-combustion engine according to the invention.

With reference to FIG. 1, a compression-ignition direct-injection internal-combustion engine comprises at least a cylinder 10, a cylinder head 12 closing the cylinder in the upper part, a fuel injector 14 carried by the cylinder head and a piston 16, which is preferably made of steel, which slides along axis XX in the cylinder with a reciprocating rectilinear motion.

Fuel is understood to be a liquid fuel such as diesel fuel, kerosene or any other fuel with the physicochemical characteristics allowing operation of an engine of compression ignition type including a direct injection system for this fuel.

This engine also comprises a burnt gas exhaust 18 with at least one exhaust pipe 20 whose opening can be controlled by in any manner such as an exhaust valve 22 for example, and an intake 24 for an oxidizer with at least one intake pipe 26 whose opening can be controlled by any mechanism such as an intake valve 28 for example.

An oxidizer is understood to be air at ambient pressure, supercharged air or a mixture of air (supercharged or not) and burnt gas.

The fuel injection comprises at least one fuel injector 30, preferably arranged along axis XX of the piston, whose nozzle 32 comprises a multiplicity of orifices through which the fuel is sprayed and projected in the direction of combustion chamber 34 of the engine.

It is from the fuel injectors that the projected fuel forms at least two fuel jet sheets, which are two sheets 36 and 38 of fuel jets 40 and 42, which, in the example shown, have a general axis merged with piston 16 while being axially positioned one above the other.

More precisely, sheet 36 that is closer to piston 16 is referred to as the lower sheet in the description hereafter, while sheet 38 further away from the piston is referred to as the upper sheet.

As can be seen in FIG. 1, these two sheets form sheet angles A1 and A2 different from one another. A sheet angle is understood to be the top angle formed by the cone originating from the injector, whose imaginary peripheral wall passes through all the axes C1 or C2 of fuel jets 40 and 42.

Advantageously, sheet angle A1 of the lower sheet is at most equal to 130°, and preferably ranges between 40° and 130°, while sheet angle A2 of the upper sheet is at most equal to 180° and preferably ranges between 150° and 180°.

Figure 2:
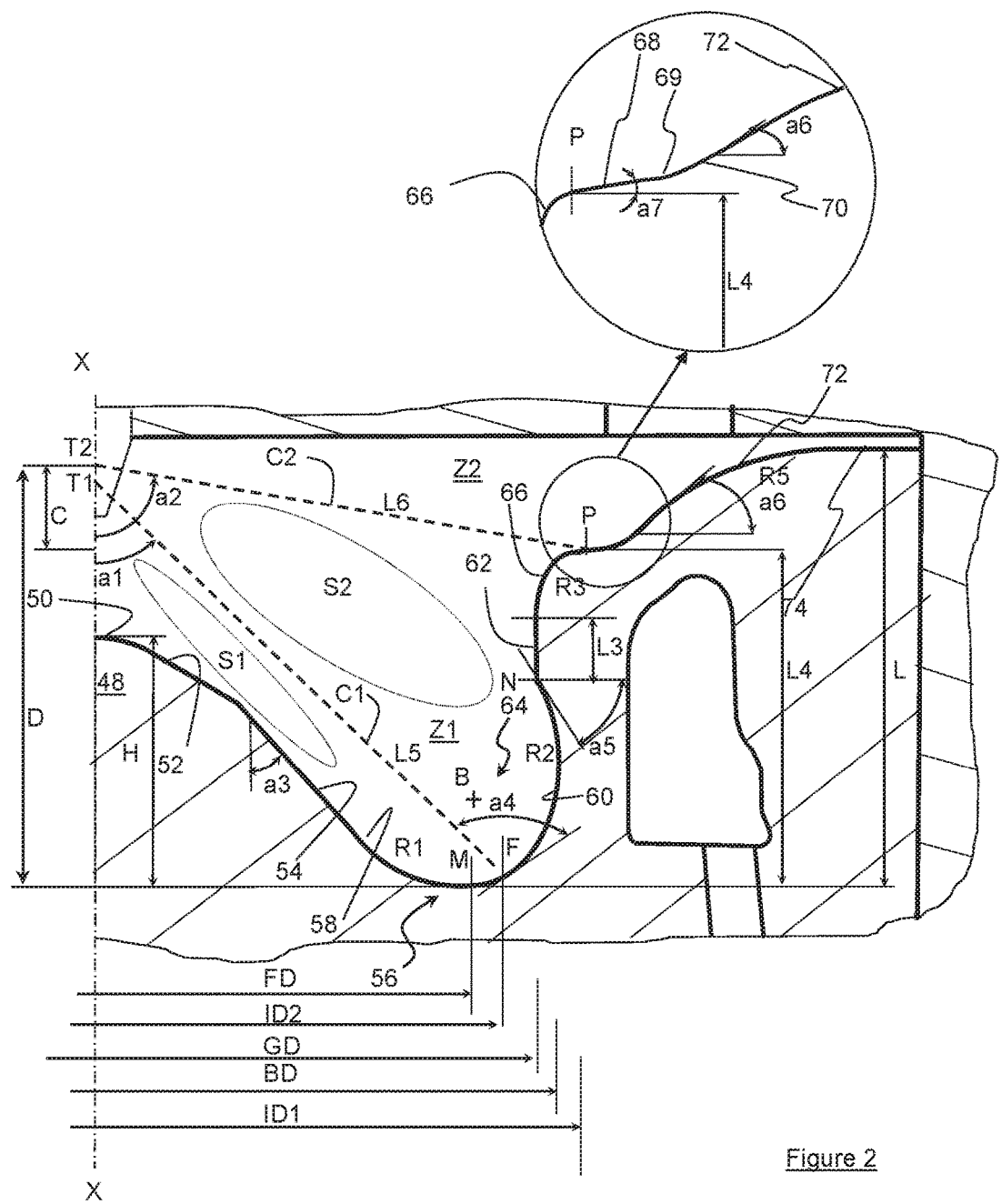
FIG. 2 is an enlarged partial view of a half section of the piston bowl profile of the engine of FIG. 1.

For simplification reasons, in the rest of the description, angle a1 corresponds to A1/2 and angle a2 corresponds to A2/2 (see FIG. 2).

The difference between the two sheet angles is thus at least 50° which limits fuel jet overlap between the two sheets and therefore formation of pollutants such as soots.

Of course, it is possible for the fuel injection not to be arranged along axis XX, but in this case the general axis of the fuel jet sheets from the fuel injector is at least substantially parallel to this axis XX.

Similarly, it is possible for each sheet to be provided by a distinct injector (single-sheet injector) with dedicated targeting in distinct zones of the combustion chamber.

Combustion chamber 34 is limited by the inner face of cylinder head 12 opposite the piston, the circular inner wall of cylinder 10 and upper face 44 of piston 16.

This upper face of the piston comprises a concave bowl 46, whose axis is here merged with that of the cylinder, whose concavity is directed towards the cylinder head and which houses a projection 48 arranged substantially in the center of the bowl, which rises towards cylinder head 12, while being preferably coaxial with the axis of the fuel sheets from injector 30.

Of course, it is possible for the axis of the bowl not to be coaxial with that of the cylinder, but the main thing is the layout according to which the axis of the fuel jet sheet, the axis of the projection and the axis of the bowl are preferably merged.

Furthermore, with reference to FIG. 2, projection 48, which is generally of truncated shape, comprises preferably a rounded top 50, while moving symmetrically away from axis XX towards the outside of piston 16, has a substantially rectilinear inclined surface 52 which is extended by an inclined flank 54 down to a bottom 56 of the bowl.

Of course, without departing from the scope of the invention, inclined surface 52 can be of (zero length) and then inclined flank 54 connects the top of the projection to the bottom of the bowl.

In the example of FIG. 2, the bottom of this bowl is rounded, with a concave rounded surface 58 configured as an arc of a circle with radius R1, which is referred to as inner rounded surface, connected to the bottom of inclined flank 54, and another concave rounded surface 60 configured as an arc of a circle with radius R2, which is referred to as outer rounded surface, connected at one end to the lower end of the inner rounded surface at a point M and at the other end thereof to a lateral wall 62, which is substantially vertical here, at a point N.

The two rounded surfaces 58 and 60 thus limit the lower part of a toroidal volume, here a torus of substantially cylindrical section 64 and of center B whose purpose is described hereafter in the description.

Lateral wall 62 is extended, while moving away from axis XX, by a convex rounded surface 66 configured as an arc of a circle with radius R3, which is referred to as re-entrant, leading extending to an inclined plane 68 linked to a concave inflection surface 69 connected to a substantially plane surface 70. This plane surface continues to an outer convex surface 72 configured as an arc of a circle with radius R5 that extends to a plane surface 74 extending up to a vicinity of the cylinder wall.

The combustion chamber thus comprises two distinct zones Z1 and Z2 where mixing of the oxidizer contain therein (air, supercharged or not, or mixture of air and recirculated burnt gas) with the fuel coming from the injector, as well as combustion of the fuel mixture thus formed, occurs.

For simplification reasons, these zones are referred to as combustion zones in the remainder of the description.

Zone Z1, limited by projection 48, torus 64 at the bowl bottom, wall 62 and convex rounded surface 66, forms the lower zone of the combustion chamber associated with lower sheet 36 of fuel jets of axis C1. Zone Z2, limited by inclined plane 68, concave surface 69, substantially plane surface 70, convex surface 72, plane surface 74, the peripheral inner wall of the cylinder and cylinder head 12, forms the upper zone of this chamber associated with upper sheet 38 of fuel jets of axis C2.

In this configuration, the bowl comprises, for a piston position close to the top dead center:

- a bowl bottom outside diameter FD with a radius considered between axis XX and the lowest point of the bowl, point M, that is at the intersection between the surfaces of radius R1 and R2,
- a bowl opening diameter BD with a radius considered in a vicinity of the bowl bottom and corresponding to a distance taken between axis XX and the furthest point of outer concave surface 60,
- a neck diameter GD with a radius corresponding to the distance between axis XX and vertical wall 62 limiting the outlet section of this bowl,
- an upper injection diameter ID1 with a radius corresponding to the distance between axis XX and the start of inflection surface 69 at point P between inclined plane 68 and concave surface 66 by limiting a length L6 of jets 38 between the origin T2 of axis C2 of the jets on the axis of the injector nozzle and point P, meeting the formula ID1/sin(a2),
- a developed length of the diametral half section Cb of the bowl, having the length from the intersection of the top of the projection with axis XX to the cylinder wall,
- a projection height H between the bowl bottom at point M and the top of the projection,
- a bowl height L between the bowl bottom at point M and plane surface 74,
- a junction height L3 corresponding to the extent of lateral wall 62 considered between the end of outer rounded surface 60 at point N and the start of outer rounded surface 66,
- a height L4 considered between point P and point M,
- an angle of inclination a3 with respect to a vertical for inclined flank 54,
- an angle of inclination a4 formed by principal axis C1 of the fuel jets of lower sheet 36 impacting the torus with the tangent to impact point F by limiting a length L5 of jets 40 between origin T1 of axis C1 of the jets on the axis of the injector nozzle and point F. This length L5 meets formula ID2/sin(a1), with ID2 corresponding to a lower injection diameter with a radius that corresponds to the distance between axis XX and point F,
- an angle of inclination a5 considered at the tangency of outer rounded surface 60 with lateral wall 62 at point N,
- an angle of inclination a6 with respect to the horizontal and the tangent to substantially plane wall 70,
- an angle of inclination a7 with respect to the horizontal and inclined plane 68 at intersection point P.

All these parameters are appreciated for a position of piston 16 in a vicinity of the top dead center that corresponds to a distance D considered between point M and the origin T2 of axis C2 of jets 42.

More precisely, this distance D is equal to the sum of height L4 and height C, height C corresponding to the axial height between origin T2 and point P. This height corresponds to formula ID1/tan(a2).

Thus, the dimension and angle parameters of this bowl meet at least one of the following conditions:
- angle a4 is greater than 80°, which amounts to passing over half the fuel jet between center B of torus 65 and the projection, and more precisely the lower part at point M, and thus generates an aerodynamic upward motion in the torus towards the top of the cylinder,
- angle a5 must be positive and less than 90°. Preferably, it has to be of the order of 30° to 40° to direct fuel jets 40 of lower sheet 36 towards oxidizer volume S1 in order to use the oxidizer of this zone while limiting upflow of this fuel towards upper sheet 38,
- oxidizer volume S1 between fuel jets 40 of the lower sheet is minimized to optimize the use of oxidizer in the chamber,
- the position of the top of projection 48 is as close as possible to nozzle 32 of injector 30 to limit the volume of oxidizer under the injector that will not be impacted by the fuel jets, which again minimizes volume S1. Thus, ratio H/L is greater than 40% and preferably greater than 60%,
- angle a3 is substantially equal to or greater than angle a1 of the lower sheet (−10°<a3−a1<10°). Thus, the general axis of the lower sheet jets is tangential to flank 54 of the projection. Fuel jets 40 of lower sheet 36 can thus interact with rounded surface 58 by vaporizing totally prior to impacting the piston,
- oxidizer volume S2 between the two sheets is non-zero since the interaction between the sheets helps minimize the pollutants. Volume S2 however needs to be minimized. Therefore, junction length L3 between the torus and re-entrant 66 (convex rounded surface of radius R3) has to be such that L3/(2*length of R2)<1 or (L3/length of R2<2) in order to ensure that oxidizer volume S2 available between the upper 38 and lower 36 sheets is low in relation to the fuel volume generated by the jets of the lower sheet,
- second combustion zone Z2 which is arranged in the upper part of the piston that starts from re-entrant 66 is intended for fuel jets 42 of upper sheet 38,
- the combustion volume of zone Z2 is at least equal to one tenth of the total volume of the bowl,
- the area referred to as compression zone is formed by inclined plane 68, concave surface 69, plane surface 70, convex surface 72 and plane surface 74. Angle a6 ranges between 10° and 75°, which allows burst fuel jets 42 to create an aerodynamic motion above the piston and additionally to use the oxidizer in the compression zone. This aerodynamics allows better fuel/oxidizer mixing above the piston, notably during expansion, thus promoting oxidation of the burnt gas,
- in order to promote the distribution of the fuel from jets 42 in the compression zone, a guiding surface 68 is provided between re-entrant 66 and surface 70. This guiding surface can be rounded in the continuation of the re-entrant or substantially plane. The purpose of this guiding surface is to concentrate fuel jets 42 and to guide them towards convex surface 72. Thus, this guiding surface has an angle a7 at intersection point P whose difference with respect to sheet angle a2 is less than 45°,
- the position of inflection surface 69 is such that distances L5 and L6 are approximately of the same order (0.5<L5/L6<2). Thus, advantageously, the fuel jets will impact substantially at the same time the piston in the torus and the inflection zone respectively,
- diameter ID1 must be such that ID1/GD>1 and ID1<(GD+(Cb−GD)*2/3). This allows fuel jets 42 to optimize the aerodynamics above the piston.

Furthermore,
- ratio BD/L is less than 6, preferably less than 4,
- ratio R2/R1 is less than 1, preferably less than 0.6,
- ratio FD/BD is less than 1,
- ratio Cb/BD is less than 2 so as to maintain complete vaporization of the fuel and to prevent wetting of the cylinder wall,
- ratio GD/BD ranges between 0.7 and 1 for the torus aerodynamics and upflow of the fuel jets, ratio H/L is greater than 40%, preferably greater than 60% to minimize the oxidizer volume between the injector nozzle and the projection, ratio L5/L6 ranges between 0.5 and 2 for the impact of the two sheets at the same time, A1 ranges between 40° and 130° with a1=A1/2, A2 ranges between 130° and 180° with a2=A2/2, a3 is substantially equal to a1, a4 is greater than 80°, a5 ranges between 0° and 90°, preferably substantially between 30° and 40°, a6 ranges between 15° and 75°, a7-a2 is less than 45°, ratio ID I/GD is greater than 1, ID1 is less than (GD+(Cb−GD)*2/3).

Thus with this bowl parametrization, the fuel jets of lower sheet 36 directly target torus 64 and they do not directly impact re-entrant 66.

Therefore, combustion of the lower fuel/oxidizer mixture occurs essentially in the torus volume, whereas combustion of the upper fuel/oxidizer mixture occurs essentially in the compression area and above the piston.

Furthermore, the interaction of the upper sheet jets with the lower sheet jets is limited, which allows the fuel/oxidizer mixture to be homogenized while meeting mechanical strength constraints at high load.

The piston also comprises cooling 76 including at least one gallery 78 associated with at least one combustion zone Z1 and Z2.

Gallery 78 is a circumferential gallery concentric to axis XX, housed in the material of the piston, each one being arranged opposite at least one combustion zone Z1, Z2.

As is known per se, a cooling fluid such as engine lubricating oil flows into the gallery through an inlet line 80 substantially parallel to axis XX and is discharged through a discharge line (not shown) of similar layout as the inlet line.

Thus, the cooling fluid circulates within the gallery while collecting part of the heat released upon combustion of the fuel mixture in the combustion zone which prevents an excessive piston temperature rise.

More specifically, gallery 78 provides removal of the heat from parts of the bowl such as outer rounded surface 60, convex rounded surface 66 (re-entrant) and inclined plane 68 connected to concave inflection surface 69 linked with substantially plane surface 70 of combustion zone Z2.

Indeed, these parts are directly located where the combustion takes place and they therefore are the piston parts that undergo the highest thermal stress.

At least one circumferential cooling gallery 78 is provided in the material of the piston which is close to the wall limiting the bowl periphery including convex rounded surface 66 (re-entrant) and inclined plane 68 connected to concave inflection surface 69 linked with substantially plane surface 70. Advantageously, gallery 78 can also extend opposite zone Z1 in the vicinity of outer rounded surface 60.

Advantageously (see FIG. 1), at least another gallery 82 with its inlet line 84 and its discharge line (not shown) can be provided in the material of the piston, in the vicinity of outer rounded surface 60 of torus 64 of zone Z1 in such a way that gallery 78 does not extend as far as this surface.

These galleries 78 and 82 preferably have a cross-sectional area ranging between 20 mm² and 200 mm², and they are supplied with cold oil, by way of example, from oil injection or spraying into the gallery/galleries at piston bottom dead center through inlet line(s) 80, 84. Gravity discharge of the oil occurs through the other line (not shown).

The cross-sectional area of the galleries, which may be different from one gallery to the other, thus prevents formation of gas pockets detrimental to piston cooling and degradation of the mechanical qualities of the piston.

By way of example, the gallery can comprise a section of cylindrical shape, of substantially trapezoidal shape such as gallery 78 or of substantially circular shape as illustrated by gallery 82.

It is however essential to have sufficient piston material thickness between the combustion zone and the gallery to not affect the mechanical strength of the piston.

Figure 3:
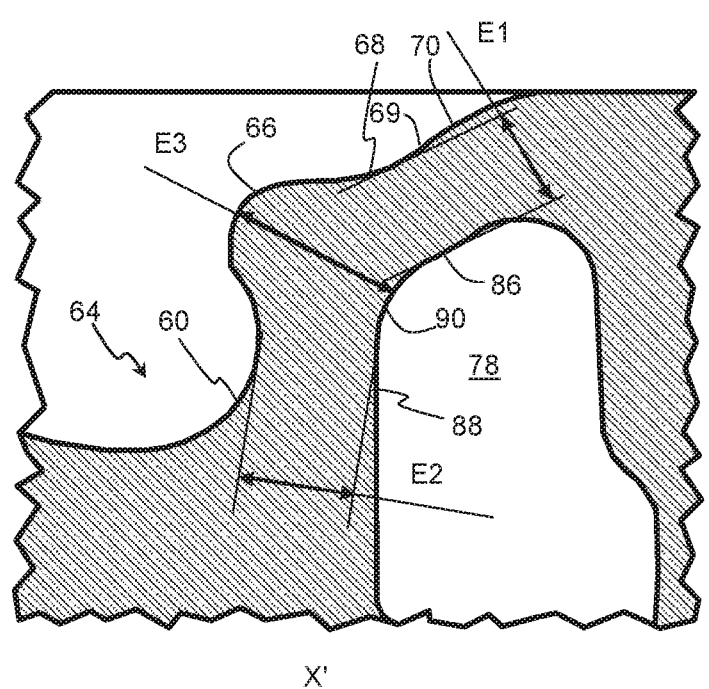
FIG. 3 illustrates on a larger scale a layout of the cooler in the piston of the engine of FIGS. 1 and 2.

More precisely, in connection with FIG. 3 by way of example, the distance between the different surfaces of the bowl and the walls of the gallery closest to the bowl must range between 2 mm and 7 mm.

More precisely, distance E1, between inclined plane 68 connected to concave inflection surface 69 and upper wall 86 of gallery 78 closest to this inclined plane, distance E2 between outer rounded surface 60 and the wall of gallery 78, vertical wall 88 here, closest to this surface, and distance E3 between convex rounded surface 66 and convex surface 90 of this gallery must be contained in the aforementioned distance range.

Similarly, if the other gallery 82 is arranged opposite outer rounded surface 60, distance E4 between this rounded surface and the wall of the closest gallery must range between 2 mm and 7 mm.

The maximum 7 mm distance provides sufficient cooling of the piston parts that undergo the highest thermal stress and thus to maintain a high reliability level.

The invention claimed is:

1. A compression-ignition direct-injection internal combustion engine comprising:
    at least one cylinder, a cylinder head carrying a fuel injector which provides fuel in at least two fuel jet sheets with different sheet angles respectively toward at least two mixing zones, a piston which slides in each of the at least one cylinder, a combustion chamber limited on one side by an upper face of the piston including a central projection extending upward toward the cylinder head which is disposed in a center of a concave bowl including the at least two mixing zones, the piston housing two circumferentially disposed galleries respectfully having differing and uniform surface area, each gallery being concentric to a center axis of the bowl, being disposed radially outward from a wall of at least one of the mixing zones, having a uniform cross sectional area through which cooling fluid is circulated around a circumference of the gallery which faces radially inward toward a wall of at least one mixing zone and which cools the combustion chamber.

2. An internal-combustion engine as claimed in claim 1, wherein a cross sectional shape of a section of the at least one gallery is cylindrical.

3. An internal-combustion engine as claimed in claim 1, wherein an area of a cross section of the at least one gallery ranges between 20 mm² and 200 mm².

4. An internal-combustion engine as claimed in claim 2, wherein an area of a cross section of the at least one gallery ranges between 20 mm² and 200 mm².

5. An internal-combustion engine as claimed in claim 1, wherein the two galleries are disposed opposite to the at least two mixing zones.

6. An internal-combustion engine as claimed in claim 2, wherein the two galleries are disposed opposite to the at least two mixing zones.

7. An internal-combustion engine as claimed in claim 3, wherein the two galleries are disposed opposite to the at least two mixing zones.

8. An internal-combustion engine as claimed in claim 4, wherein the two galleries are disposed opposite to the at least two mixing zones.

9. An internal-combustion engine as claimed in claim 1, wherein a distance between surfaces of the bowl and the walls of a gallery closest to the bowl ranges between 2 mm and 7 mm.

10. An internal-combustion engine as claimed in claim 2, wherein a distance between surfaces of the bowl and the walls of closest to the bowl ranges between 2 mm and 7 mm.

11. An internal-combustion engine as claimed in claim 3, wherein a distance between surfaces of the bowl and the walls of a closest to the bowl ranges between 2 mm and 7 mm.

12. An internal-combustion engine as claimed in claim 4, wherein a distance between surfaces of the bowl and the walls of a closest to the bowl ranges between 2 mm and 7 mm.

13. An internal-combustion engine as claimed in claim 5, wherein a distance between surfaces of the bowl and the walls of a closest to the bowl ranges between 2 mm and 7 mm.

14. An internal-combustion engine as claimed in claim 5, wherein a distance between surfaces of the bowl and the walls of a closest to the bowl ranges between 2 mm and 7 mm.

15. An internal-combustion engine as claimed in claim 6, wherein a distance between surfaces of the bowl and the walls of a closest to the bowl ranges between 2 mm and 7 mm.

16. An internal-combustion engine as claimed in claim 7, wherein a distance between surfaces of the bowl and the walls of a closest to the bowl ranges between 2 mm and 7 mm.

17. An internal-combustion engine as claimed in claim 8, wherein a distance between surfaces of the bowl and the walls of a closest to the bowl ranges between 2 mm and 7 mm.

* * * * *